(12) United States Patent
Nakamura et al.

(10) Patent No.: US 7,778,791 B2
(45) Date of Patent: Aug. 17, 2010

(54) ELECTRONIC CLINICAL THERMOMETER, METHOD OF CONTROLLING THE SAME, AND CONTROL PROGRAM

(75) Inventors: Kouji Nakamura, Fujinomiya (JP); Makoto Ikeda, Fujinomiya (JP)

(73) Assignee: Terumo Kabushiki Kaisha, Shibuya-Ku, Tokyo (JP)

( * ) Notice: Subject to any disclaimer, the term of this patent is extended or adjusted under 35 U.S.C. 154(b) by 130 days.

(21) Appl. No.: 12/007,554

(22) Filed: Jan. 11, 2008

(65) Prior Publication Data

US 2008/0177496 A1 Jul. 24, 2008

Related U.S. Application Data

(63) Continuation of application No. PCT/JP2006/313387, filed on Jul. 5, 2006.

(30) Foreign Application Priority Data

Jul. 12, 2005 (JP) .............................. 2005-203127

(51) Int. Cl.
*G01K 1/00* (2006.01)

(52) U.S. Cl. ..................... 702/130; 374/100; 374/120; 374/E5.012; 600/474; 600/549; 702/99; 702/136

(58) Field of Classification Search ................ 702/99, 702/131, 136, 130; 374/100, 110, 120, E5.012; 600/474, 549

See application file for complete search history.

(56) References Cited

U.S. PATENT DOCUMENTS

| | | | | |
|---|---|---|---|---|
| 4,866,621 | A * | 9/1989 | Ono | ........................... 600/549 |
| 5,066,161 | A | 11/1991 | Pinney | |
| 5,259,389 | A * | 11/1993 | Muramoto et al. | .......... 600/546 |
| 5,392,031 | A | 2/1995 | Toriumi et al. | |
| 5,738,441 | A * | 4/1998 | Cambridge et al. | ......... 374/102 |

FOREIGN PATENT DOCUMENTS

| | | |
|---|---|---|
| GB | 2 122 756 A | 1/1984 |
| JP | 59-18425 A | 1/1984 |
| JP | 59-114424 A | 7/1984 |

(Continued)

OTHER PUBLICATIONS

Extended European Search Report issued in corres. EP Patent Application No. 06 76 7893, Apr. 6, 2009, EPO, The Hague, The Netherlands.

(Continued)

*Primary Examiner*—Eliseo Ramos Feliciano
*Assistant Examiner*—Elias Desta
(74) *Attorney, Agent, or Firm*—Buchanan Ingersoll & Rooney PC

(57) ABSTRACT

An electronic clinical thermometer capable of high-precision measurement within a shorter period of time. The electronic clinical thermometer for predicting an equilibrium temperature based on a temporal change in actual measurement value of a measurement target temperature detected by a temperature detection element includes a prediction value derivation unit which derives a plurality of prediction values from actual measurement values in accordance with a plurality of prediction equations, a selection unit which selects one of the plurality of prediction equations based on the selected prediction equation, and a display output which displays a prediction value result based on the selected prediction equation.

11 Claims, 8 Drawing Sheets

FOREIGN PATENT DOCUMENTS

| | | |
|---|---|---|
| JP | 3-122535 A | 5/1991 |
| JP | 5-264363 A | 10/1993 |

OTHER PUBLICATIONS

English Language Versions of International Preliminary Report on Patentability and Written Opinion issued in corresponding International Patent Application No. PCT/JP2006/313387; Feb. 4, 2008; The International Bureau of WIPO, Geneva, CH.
PCT/ISA/210, Sep. 19, 2006.
PCT/ISA/237, Jul. 5, 2006.

* cited by examiner

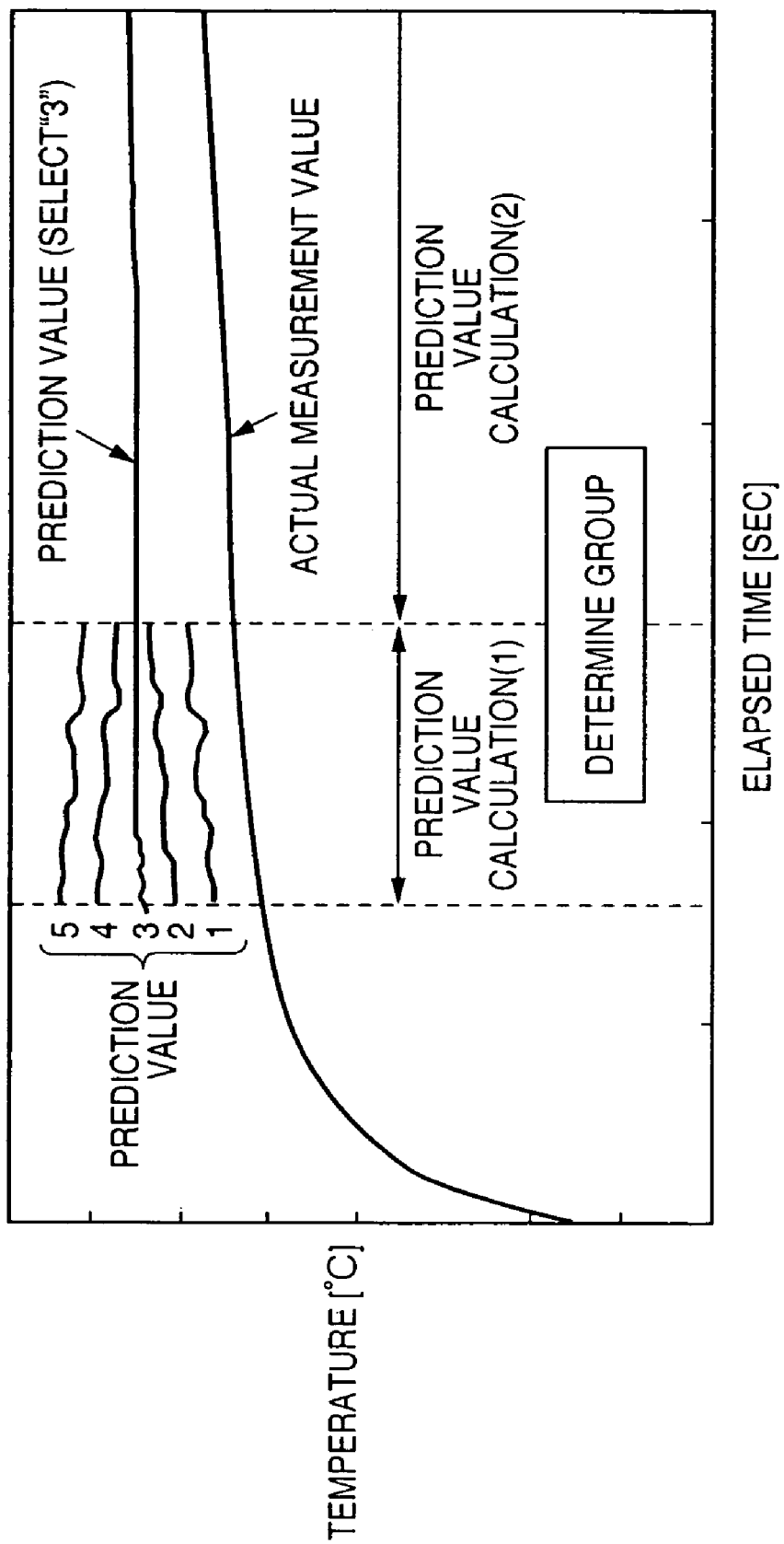

ELECTRONIC CLINICAL THERMOMETER, METHOD OF CONTROLLING THE SAME, AND CONTROL PROGRAM

TECHNICAL FIELD

The present invention relates to a high-speed body temperature calculation technique in an electronic clinical thermometer.

BACKGROUND ART

In a conventional prediction type electronic clinical thermometer, prediction operation starts at a time when the actual measurement value is equal to or more than a predetermined value and the rate of temperature rise is equal to or more than a predetermined value. A prediction settling point is given at a time when a variation in prediction value falls within a predetermined value. A prediction value Y is generally given by Y=T+U where T is the actual measurement value and U is the additional value.

A variety of calculation methods provide the additional amount U, and examples of the calculation methods are $U = a_1 \times dT/dt + b_1$ and $U = (a_2 \times t + b_2) \times dT + (c_2 \times t + d_2)$ The parameters $a_1$, $b_1$, $a_2$, $b_2$, $c_2$, and $d_2$ are constants selected to keep the precision of the additional amount U constant regardless of patients and temperature detection elements.

Parameters used for prediction calculation equations are grouped depending on the features of patients and the characteristics of temperature detection elements. In particular, there is disclosed a technique for determining parameter groups based on actual measurement values of the temperature detection element to allow prediction with a higher precision. There is also disclosed a technique for changing corresponding parameter groups based on temporal changes in prediction values upon determining the parameter groups to allow prediction with a higher precision (patent reference 1).

Upon power-on of an electronic clinical thermometer, data necessary for temperature measurement such as temperature measurement parameters are read out from a nonvolatile memory such as an EEPROM. A conventional arrangement reads out these data immediately after power-on.

Upon power-on of the electronic clinical thermometer, when the thermometer is to be inserted into an underarm of a user and the metal cap at its distal end comes into contact with an electrostatically charged piece of clothing worn by the user, the thermometer may fail to read out the data necessary for temperature measurement due to an electrostatic influence. When the conventional clinical thermometer fails to read out data from the EEPROM, it informs the user of a temperature measurement error and prompts him to retry the temperature measurement (patent reference 2).

Patent Reference 1: Japanese Patent No. 3100741
Patent Reference 2: Japanese Patent Laid-Open No. 59-114424

DISCLOSURE OF INVENTION

Problems that the Invention is to Solve

In the conventional prediction type electronic clinical thermometer, however, since the heat capacity of a temperature detection element and its vicinity is high, it takes a long time (e.g., 90 sec) to cause the temperature detection element to reach a thermal equilibrium. The prediction calculation time is much shorter than the time required to cause the temperature measurement element to reach a thermal equilibrium with a measurement target. Even if high-speed prediction calculation is performed with a recent energy-saving, high-speed CPU, a decrease in time required until the result is displayed is limited. Therefore, it takes a long time until the end of measurement, which imposes a load on a measurement operator.

The present invention has been made in consideration of the above problem, and has as its object to implement an electronic clinical thermometer capable of measurement with a higher precision within a shorter period of time and to reduce the load on a measurement operator.

Means of Solving the Problem

In order to solve the above problem, an electronic clinical thermometer according to the present invention comprises the following arrangement. That is, there is provided an electronic clinical thermometer for predicting an equilibrium temperature based on a temporal change in actual measurement value of a measurement target temperature detected by a temperature detection element, comprising prediction value derivation means for deriving a plurality of prediction values from actual measurement values in accordance with a plurality of prediction equations, selection means for selecting one of the plurality of prediction equations based on the selected prediction equation, and display output means for displaying a prediction value result based on the selected prediction equation.

The electronic clinical thermometer is characterized in that the selection means selects a prediction equation by which a temporal change in prediction value is minimum.

In order to solve the above problem, an electronic clinical thermometer according to the present invention has the following arrangement. That is, there is provided an electronic clinical thermometer for predicting an equilibrium temperature based on a temporal change in the actual measurement value of a measurement target temperature detected by a temperature detection element, comprising prediction value derivation means for deriving a plurality of prediction values from actual measurement values in accordance with a plurality of prediction equations, selection means for selecting one of the plurality of prediction equations based on a temporal change in actual measurement value, and display output means for displaying a prediction value result derived based on the selected prediction equation.

The electronic clinical thermometer is characterized in that the plurality of prediction equations are set in correspondence with a plurality of groups obtained depending on a characteristic of the temporal change in the actual measurement value.

The electronic clinical thermometer is characterized in that the heat capacity of the temperature measurement element and its vicinity is low but the heat response is high.

The electronic clinical thermometer is further characterized by comprising a temperature measurement start means for detecting a temperature rise and starting temperature measurement operation, storage means for storing data necessary for temperature measurement, including at least a temperature measurement end condition, and readout timing control means for controlling a readout timing for reading out the data from the storage means, wherein the readout timing means reads out the necessary data from the storage means when the predetermined condition is met upon power-on of the electronic clinical thermometer.

The electronic clinical thermometer is characterized in that the predetermined condition is detection of a temperature rise exceeding a predetermined period of time upon power-on of the electronic clinical thermometer.

The electronic clinical thermometer is characterized in that the temperature measurement end condition is defined such that the temperature rise within the predetermined period of time is less than a predetermined temperature value.

The electronic clinical thermometer is characterized in that the storage means comprises a nonvolatile memory.

The electronic clinical thermometer is characterized in that the nonvolatile memory comprises an EEPROM.

Other features of the present invention will be apparent from the following description of the mode for practicing the invention and the accompanying drawings.

In order to solve the above problem, a method of controlling an electronic clinical thermometer according to the present invention has the following steps. That is, there is provided a method of controlling an electronic clinical thermometer for predicting an equilibrium temperature based on a temporal change in actual measurement value of a measurement target temperature detected by a temperature detection element, comprising a prediction value derivation step of deriving a plurality of prediction values from actual measurement values in accordance with a plurality of prediction equations, a selection step of selecting one of the plurality of prediction equations based on the selected prediction equation, and a display output step of displaying a prediction value result based on the selected prediction equation.

In order to solve the above problem, a control program of an electronic clinical thermometer according to the present invention has the following program codes. That is, there is provided a control program of an electronic clinical thermometer for predicting an equilibrium temperature based on a temporal change in actual measurement value of a measurement target temperature detected by a temperature detection element, comprising a program code for implementing a prediction value derivation step of deriving a plurality of prediction values from actual measurement values in accordance with a plurality of prediction equations, a program code for implementing a selection step of selecting one of the plurality of prediction equations based on the selected prediction equation, and a program code for implementing a display output step of displaying a prediction value result based on the selected prediction equation.

Effects of the Invention

According to the present invention, there is implemented an electronic clinical thermometer capable of measurement with a higher precision within a shorter period of time, thereby reducing the load on a measurement operator.

BRIEF DESCRIPTION OF DRAWINGS

FIG. 8 is a graph for explaining group determination based on the changes in a plurality of prediction values.

BEST MODE FOR CARRYING OUT THE INVENTION

An exemplary embodiment of the present invention will be described in detail with reference to the accompanying drawings. The constituent elements described in the embodiment are merely examples. The scope of the present invention is not limited to these constituent elements.

First Embodiment

<Outline of Deriving Temperature of Electronic Clinical Thermometer at High Speed>

In this embodiment, the heat capacity of a temperature sensor of an electronic clinical thermometer is reduced to increase the heat response, thereby shortening the measurement time for obtaining actual measurement values used for prediction. In this case, selection is made based on the calculation results using a plurality of prediction equations. This makes it possible to suppress a decrease in precision caused by variations in actual measurement values along with an increase in heat response.

<Internal Arrangement of Electronic Clinical Thermometer>

Figure 1A:
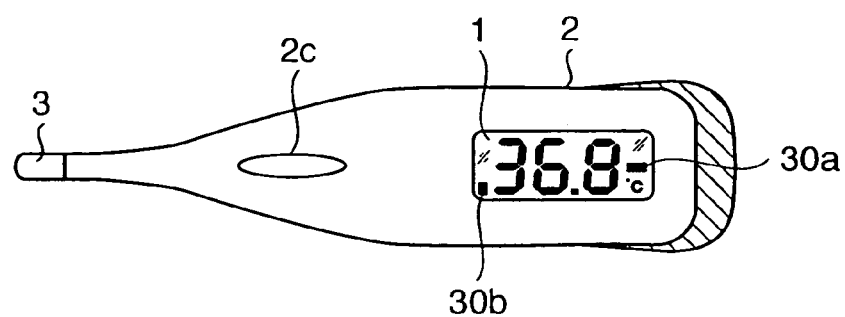
FIG. 1A is an outer view (front view) of an electronic clinical thermometer according to the first embodiment.
Figure 1B:
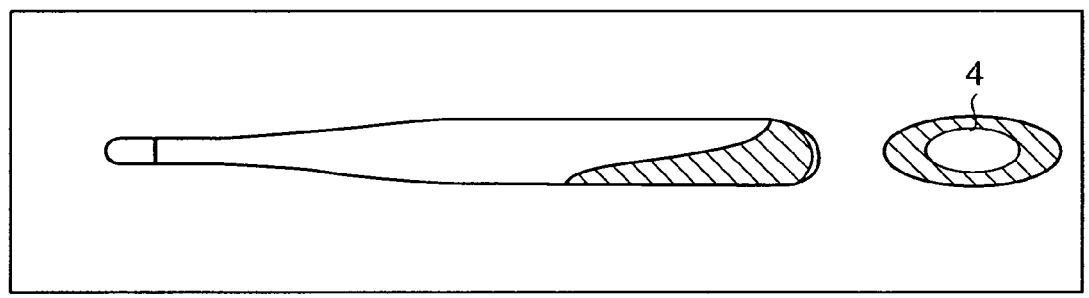
FIG. 1B is an outer view (side view) of the electronic clinical thermometer according to the first embodiment.
Figure 1C:
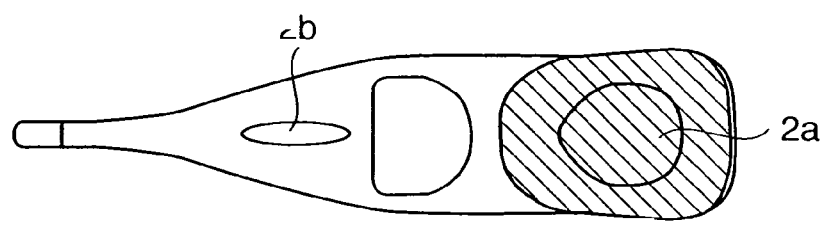
FIG. 1C is an outer view (rear view) of the electronic clinical thermometer according to the first embodiment.

FIGS. 1A to 1C are views showing the outer appearance of an electronic clinical thermometer according to an embodiment, in which FIG. 1A is a front view, FIG. 1B is a side view, and FIG. 1C is a rear view. A main body case 2 houses an electronic circuit such as an arithmetic control unit 20, a buzzer 31, a battery (power supply unit) 40, and the like. A metal cap 3 made of stainless steel houses a temperature measurement unit including a thermistor 13 (see FIG. 2) necessary for body temperature measurement. The temperature measurement unit is fixed in the metal cap 3 with an adhesive. An adhesive liquid-tightly bonds and fixes the main body cap 2 and the metal cap 3. The metal cap 3 transfers the body temperature (temperature) and protects the thermistor 13 against an external impact or the like. The main body case 2 has an outer diameter of about 3 mm, a thickness of about 0.2 mm, an overall length of about 8 mm, and a weight of 240 to 250 mg. The length of a joint portion at the distal end of the main body case 2 is about 3.5 mm to 5 mm. The heat capacity of the heat sensitive portion including the metal cap 3 incorporating the thermistor 13 is as low as about 0.1 J/° C. The main body case 2 is made of a styrene-based resin (high impact styrole or ABS resin) or polyolefin-based resin (polypropylene or polyethylene) containing about 1 to 2.5 wt % of a silver zirconium phosphate compound. A transparent window portion 1 which covers a display unit 30 and the remaining portion of the main body case 3 are molded in two colors. The window portion 1 is made of a transparent resin such as a styrene-based resin (e.g., polystyrene or a butadiene-styrene copolymer), a polyolefin-based resin (e.g., poly-2-methyl pentene or polypropylene), an acrylic resin (e.g., polymethylmethacrylate), a cellulose ester (e.g., cellulose acetate), or a polyester (e.g., polyethylene terephthalate). The end of the main body case 2 which opposes the metal cap 3 has a power ON/OFF switch 4. The lower surface of the main body case 2 has a recessed portion 2a. Upon temperature measurement, the user can easily hold the electronic clinical thermometer with the recessed portion 2a and can easily remove it from the underarm. Stoppers 2b and 2c prevent the electronic clinical thermometer from slipping during temperature measurement. A slanted line indicates a battery lid used to replace a battery and a storage position of the battery (power supply unit) 40. When the battery 40 is stored, the center of gravity is located on the front side in the longitudinal direction of the thermometer. A prediction mode display portion 30a displays a prediction mode. A mute (silent) mode display portion 30b displays a so-called mute (silent) mode in which a buzzer sound is not generated. The electronic clinical thermometer has a width of about 28 mm, a thickness of about 10 mm, and a weight of about 20 g. The position of the center of gravity, width, weight, and means for preventing from sliding stabilize the electronic clinical thermometer when it is attached to part of the human body.

Figure 2:
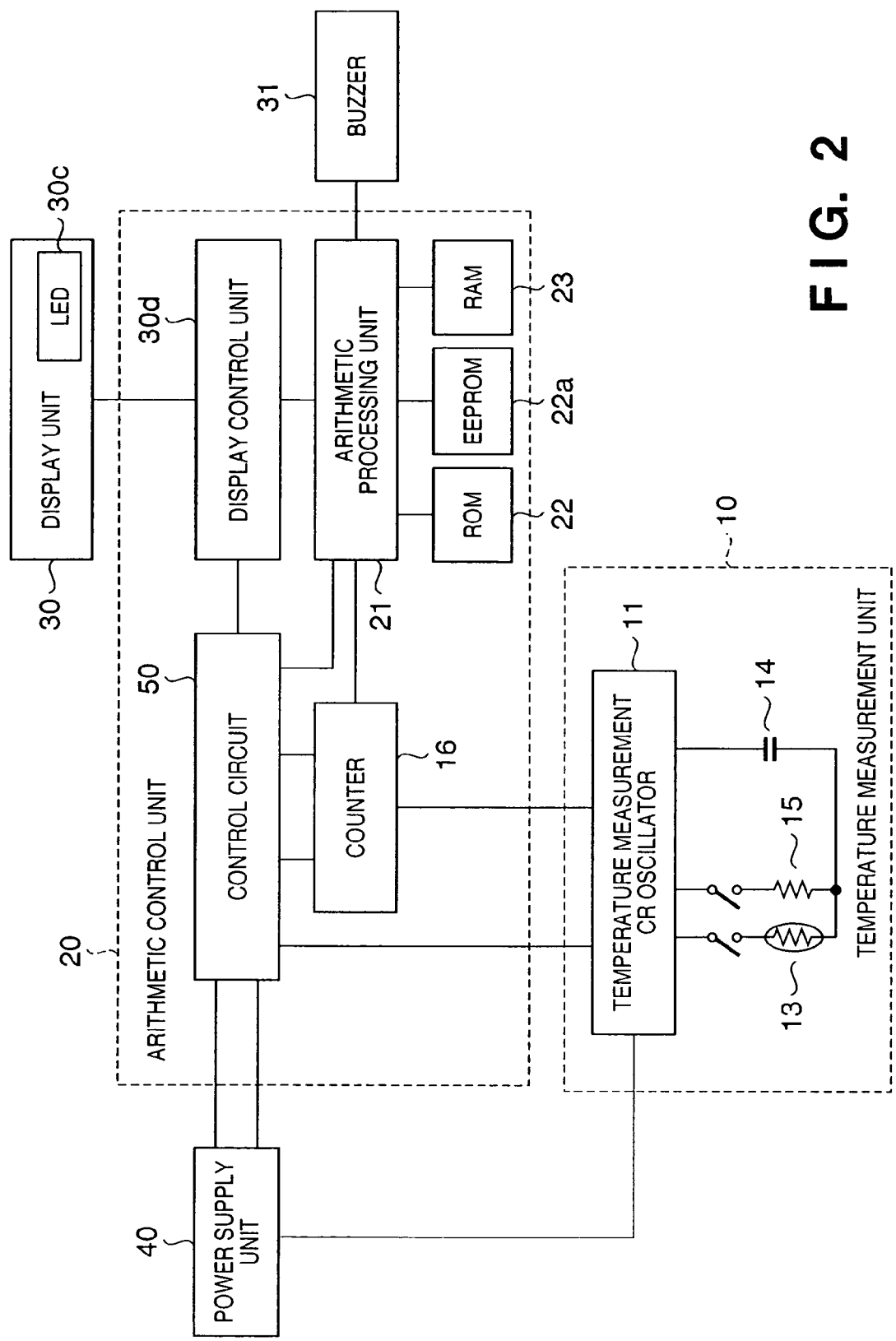
FIG. 2 is an internal block diagram of the electronic clinical thermometer according to the first embodiment.

FIG. 2 is an internal block diagram showing the arrangement of the electronic clinical thermometer of this embodiment.

This electronic clinical thermometer comprises a temperature measurement unit 10 for measuring a temperature and outputting it as a digital value, an arithmetic control unit 20 for calculating a prediction temperature from a measured temperature and controlling this electronic clinical thermometer, and a display unit 30 which displays a measurement result and comprises a backlight LED 30c.

The temperature measurement unit 10 comprises the thermistor 13, a capacitor 14, and a temperature measurement CR oscillator 11. The thermistor 13 and capacitor 14 are connected in parallel with each other and arranged in the temperature sensitive portion. The temperature measurement unit 10 outputs the temperature as a digital amount in accordance with the count value of a counter 16 which corresponds to the temperature of the thermistor 13. Note that the arrangement of the electronic clinical thermometer 10 is merely an example and is not limited to this.

The arithmetic control unit 20 comprises an EEPROM 22a which stores parameters necessary for body temperature measurement, a RAM 23 for storing time-series measured temperatures, a ROM 22 which stores programs such as prediction equations, a display control unit 30d for controlling the display unit 30, the counter 16 for counting oscillation signals from the temperature measurement CR oscillator 11, an arithmetic processing unit 21 for performing processing under conditions written in the EEPROM 22a in accordance with the programs in the ROM 22, and a control circuit 50 for controlling the counter 16, arithmetic processing unit 21, and display control unit 30d.

As the characteristic feature of this embodiment, the heat capacity of the thermistor 13 and its vicinity is much smaller than that of the conventional prediction type electronic clinical thermometer and is thus excellent in heat response. The heat capacity of the peripheral portion includes those of the metal cap 3 contacting a measurement target of the body and covering the thermistor 13, and the adhesive between the metal cap 3 and the thermistor 13.

<Readout Control of Data Necessary for Temperature Measurement>

Readout control of data necessary for temperature measurement will be described with reference to FIGS. 3 and 4.

Figure 3:
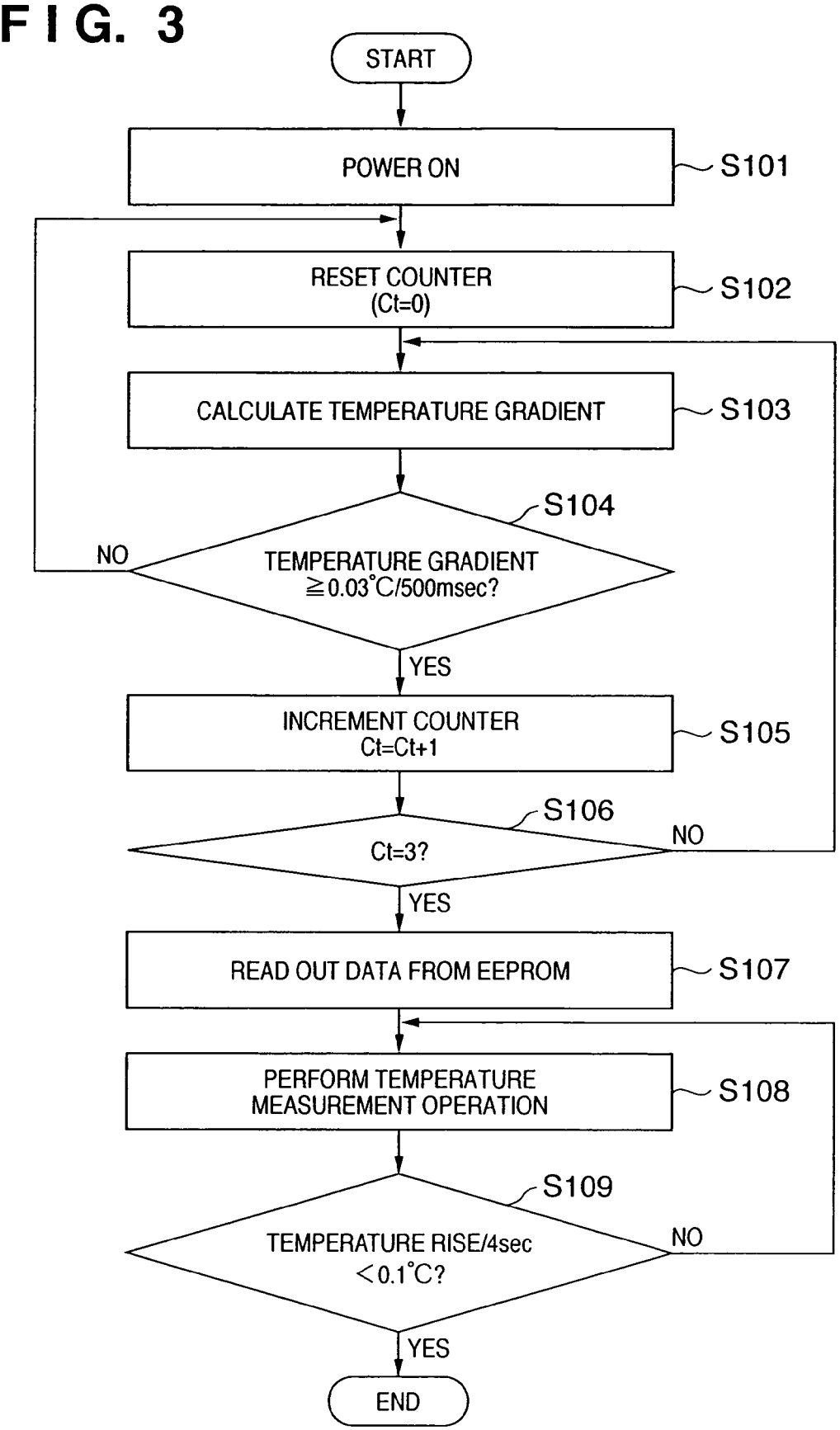
FIG. 3 is a flowchart showing data readout timing control of the electronic clinical thermometer according to the first embodiment.
Figure 4:
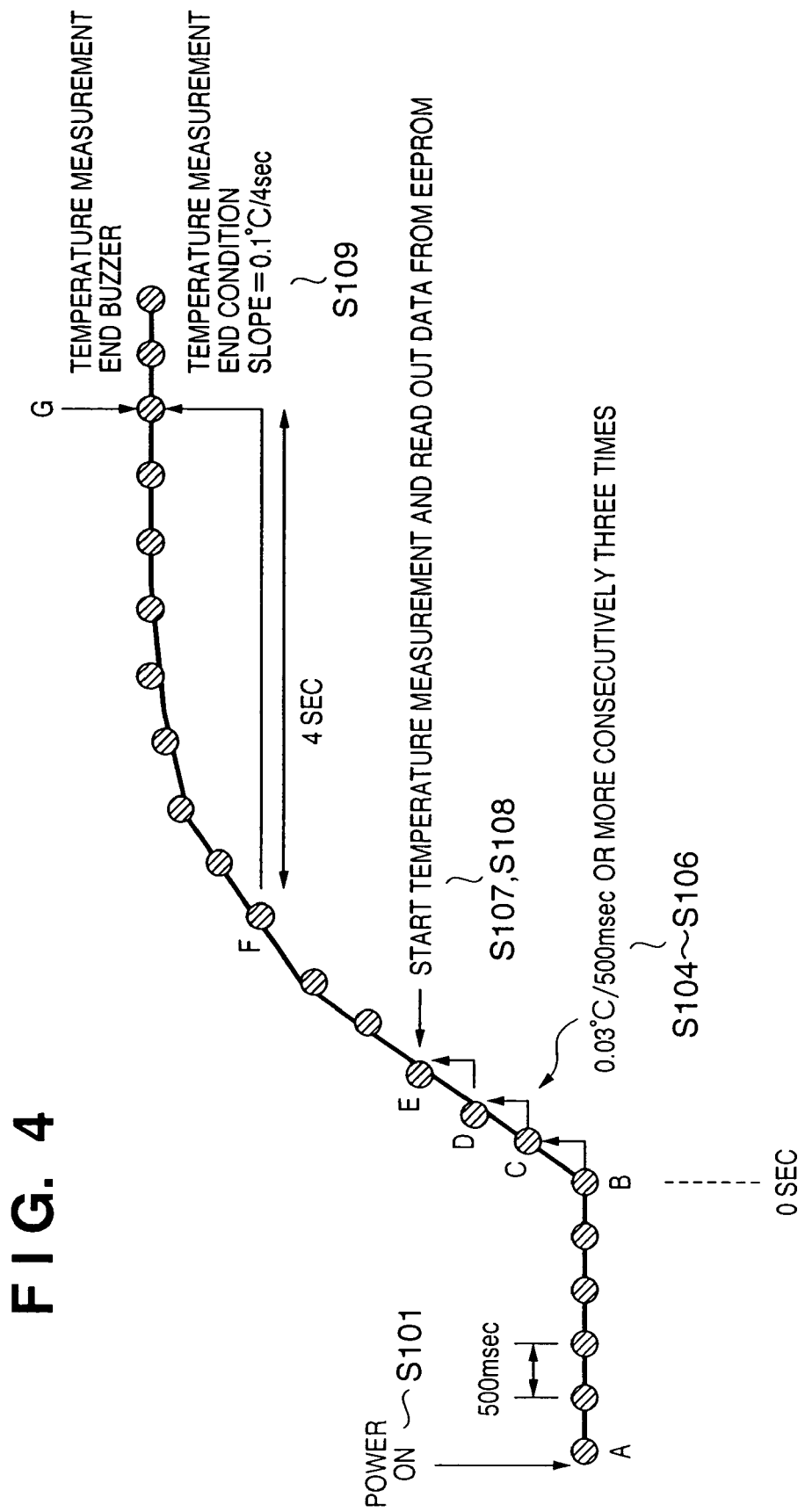
FIG. 4 is a view showing the correspondence between a temperature measurement curve and the respective steps of the flowchart of FIG. 3.

FIG. 3 is a flowchart for explaining operation for controlling a readout timing of data necessary for temperature measurement. FIG. 4 is a view showing the correspondence between a temperature rise curve example and the operations in FIG. 3. Note that the arithmetic processing unit (CPU) 21 performs operation control of the steps in FIG. 3.

When the CPU detects power-on in step S101 in FIG. 3, the CPU reads out the program corresponding to the flowchart in FIG. 3 from the ROM 24 and expands the program in the RAM 23 to prepare for the start of operation. As shown in FIG. 4, the CPU samples temperature data every predetermined period of time interval, for example, 500 msec.

The CPU resets a counter value Ct of the temperature rise detection counter 25 to Ct=0 in step S102. The temperature rise detection counter 25 counts the number of times the temperature gradient is equal to or more than 0.03° C./500 msec. In step S103, the CPU executes arithmetic operation for obtaining a temperature gradient at each point from the temperature data obtained upon sampling.

The CPU determines in step S104 whether the temperature gradient calculated in step S103 is equal to or more than a predetermined value (e.g., 0.03° C./500 msec). If YES in step S104, the process advances to step S105; otherwise, the process returns to step S102 to reset the counter value Ct.

The CPU counts up the counter value Ct in step S105. The CPU determines in step S106 whether the counter value is a predetermined value (e.g., 3). If YES in step S106, the process advances to step S107; otherwise, the process returns to step S103 to execute temperature gradient calculation or the like (steps S103 to S105).

When the counter value Ct reaches the predetermined value (e.g., 3), the CPU detects that the temperature rise is sufficient. The CPU determines that the thermometer has been inserted in the measurement target (e.g., an underarm or in a mouth). Since the thermometer has already been inserted, data read error does not occur due to an electrostatic influence. That is, even if static electricity is generated during insertion, it is conducted to the human body having an impedance lower than that of the metal cap 3 along the surface layer of the main body case 2 made of a resin. The internal circuit of the thermometer is free from the electrostatic influence. In step S107, data necessary for temperature measurement is read out from the EEPROM 22a and stored in the RAM 23.

In step S108, the CPU executes temperature measurement operation using the data read out from the EEPROM 22a. The CPU determines in step S109 whether the temperature rise is less than 0.1° C. per predetermined value (e.g., 4 sec). If NO in step S108, the temperature measurement operation continues in step S108. If YES in step S108, the CPU determines that the temperature measurement is complete. The buzzer generates a temperature measurement end sound to inform the user of the end of temperature measurement.

The above operation will be described in correspondence with the temperature curve in FIG. 4. Referring to FIG. 4, the temperature curve between points A and B is flat. This indicates that the thermometer is not inserted in the measurement target yet. The CPU detects a continuous temperature rise of 0.03° C./500 msec three times at points C, D, and E. The CPU determines that the thermometer was inserted into the measurement target at the point B. That is, the internal temperature measurement start time is the point B.

When the CPU determines that the temperature rise is equal to or more than the predetermined value (e.g., 0.03° C.) consecutively a predetermined number of times (three times), the CPU determines that the thermometer has been inserted into the measurement target. At this timing, the CPU reads out the data necessary for temperature measurement from the EEPROM 22a, thereby starting the temperature measurement.

In the above example, the temperature rise is monitored even during temperature measurement operation. If the temperature rise is less than a predetermined value (e.g., 0.1° C.) per predetermined value (e.g., 4 sec), the temperature measurement ends. In the temperature curve in FIG. 4, the CPU determines that the temperature rise between points F and G is less than 0.1° C., and determines the end of temperature measurement.

<Grouping and Prediction Equation>

Figure 5:
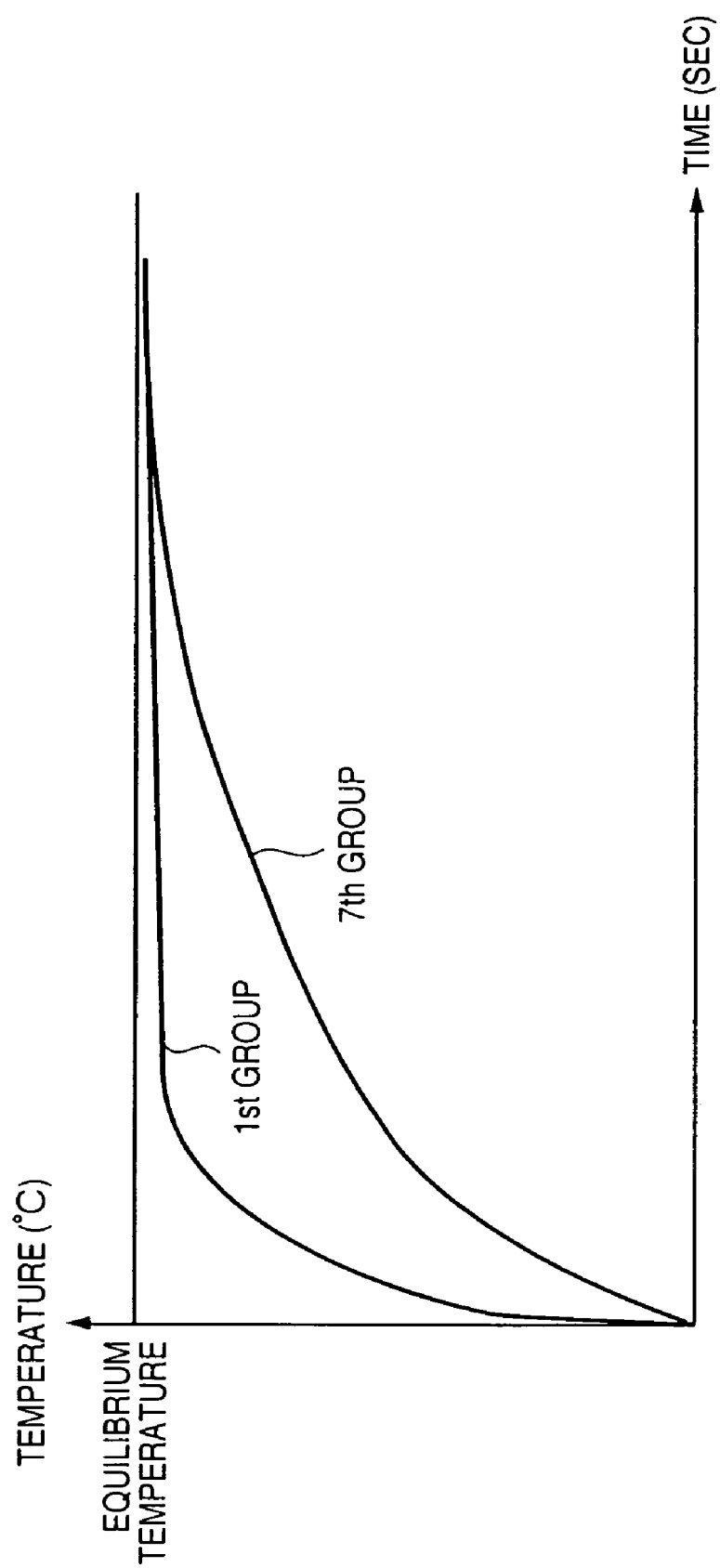
FIG. 5 shows changes in the actual measurement values of the temperature detection element.

FIG. 5 is a graph exemplifying changes in actual measurement values of the electronic clinical thermometer inserted in an underarm.

As can be apparent from FIG. 5, the actual measurement value approaches the equilibrium temperature along with elapse of time. The temperature rise rate changes depending on the measurement conditions such as physical constitutions of patients, and contact states between the temperature and the body surface. The CPU groups the actual measurement values in accordance with their temporal change characteristics.

Grouping will be described from the characteristics of actual measurement values detected by the thermistor 13. In this embodiment, as described previously, the heat response characteristic of the temperature detection element is good, and the temporal change characteristics of the actual measurement values tend to vary. To cope with this heat response characteristic, the actual measurement values are grouped into the number of groups (in this case, 13 groups) larger than that of the number of conventional groups (e.g., 7 groups).

Figure 6:
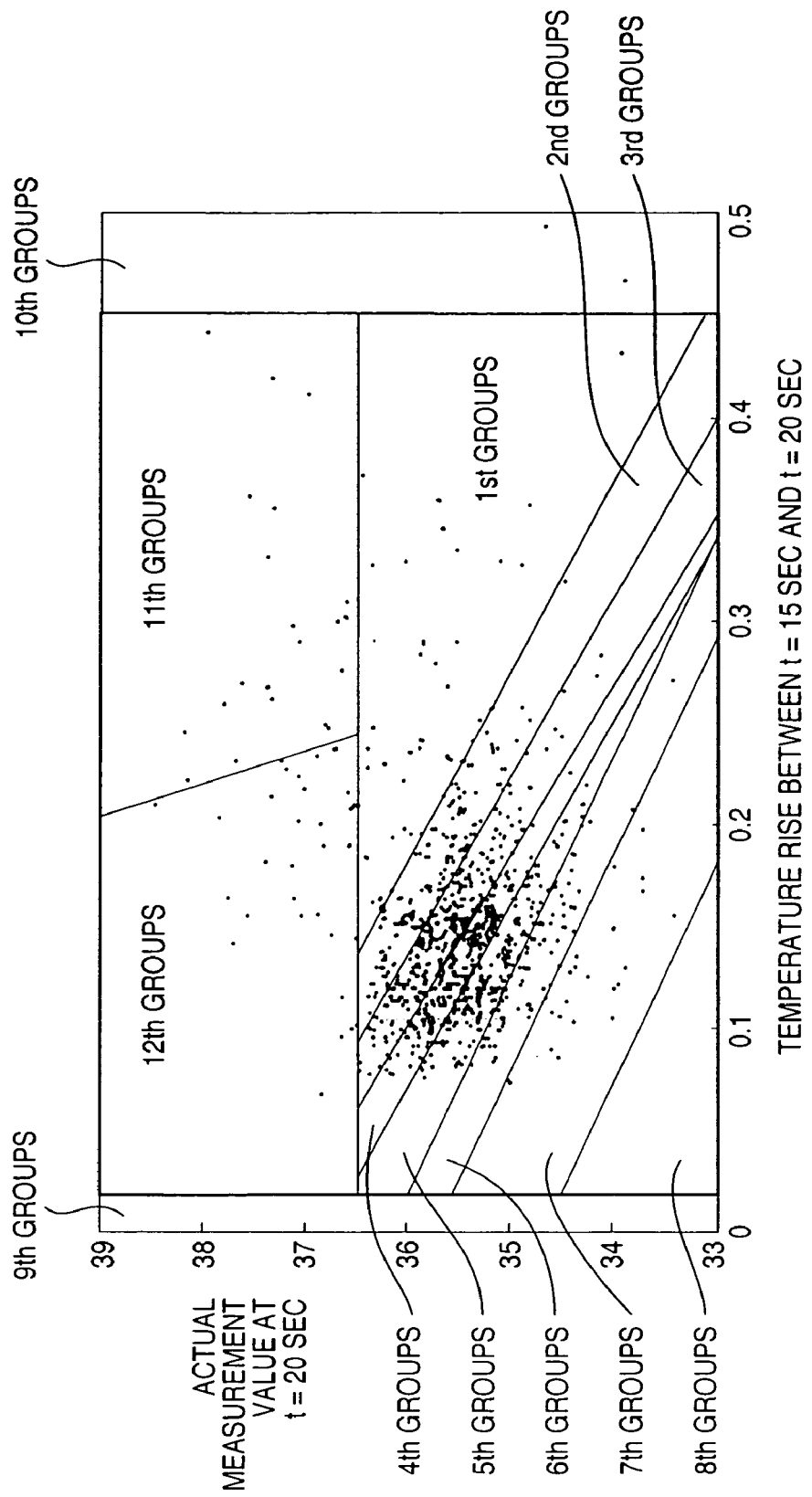
FIG. 6 is a graph for explaining grouping based on the measurement values of the electronic clinical thermometer according to the first embodiment.

FIG. 6 is a graph showing a grouping example in accordance with the temporal change characteristics of actual measurement values.

FIG. 6 shows an example in which the actual measurement values are grouped into 13 groups using the temperature rise values (ordinate in FIG. 6) between t=15 sec and t=20 sec and the temperatures (abscissa in FIG. 6) at t=20 sec. The points in the graph indicate the distribution of measurement samples. Note that the first group includes actual measurement values having a highest heat response and high initial temperatures, but the temperature rise immediately declines. To the contrary, the eighth group includes actual measurement values having a lowest heat response and low initial temperatures, but the temperature rise lasts longer. Since the actual measurement values belonging to the ninth and tenth groups fall greatly outside the normal actual measurement value changes, these values may be regarded as prediction disable values, and the measurement may end with an error. Alternatively, the actual measurement value may be displayed without any prediction. The actual measurement values belonging to the 11th and 12th groups indicate body temperatures of 36.5° C. or more.

Upon the above grouping, for example, the timing at which the actual measurement value is 30° C. or more and the temperature rise rate is 0.03° C./0.5 sec is defined as a start point (t=0), and a prediction value Y can be approximated using the actual measurement value T and the elapsed time t by:

$$U=(a \times t+b) \times dT+(c \times t+d)$$

for Y=T+U, where "a" to "d" are constants, and dT is the temperature rise in the past 5 seconds.

The prediction operation is performed from t=20 sec using the coefficients "a" to "d" corresponding to the groups described in the above grouping. The coefficients "a" to "d" of the respective groups in the interval between t=20 sec and t=25 sec are exemplified below. Note that the coefficients "a" to "d" are obtained from a large number of measurement samples and are some of the parameters 22b stored in the ROM 22.

First group: a=0.554, b=−6.5185, c=−0.1545, d=2.8915
Second group: a=1.1098, b=−15.446, c=−0.244, d=4.5294
Third group: a=0.7189, b=−6.9876, c=−0.0571, d=1.0682
Fourth group: a=0.8092, b=−7.8356, c=−0.0448, d=0.8609
Fifth group: a=0.8555, b=−9.2469, c=−0.0697, d=1.5205
Sixth group: a=0.4548, b=−2.1512, c=0.0083, d=0.2872
Seventh group: a=0.378, b=−1.3742, c=0.0027, d=0.8912

<Body Temperature Measurement Operation of Electronic Clinical Thermometer>

Figure 7:
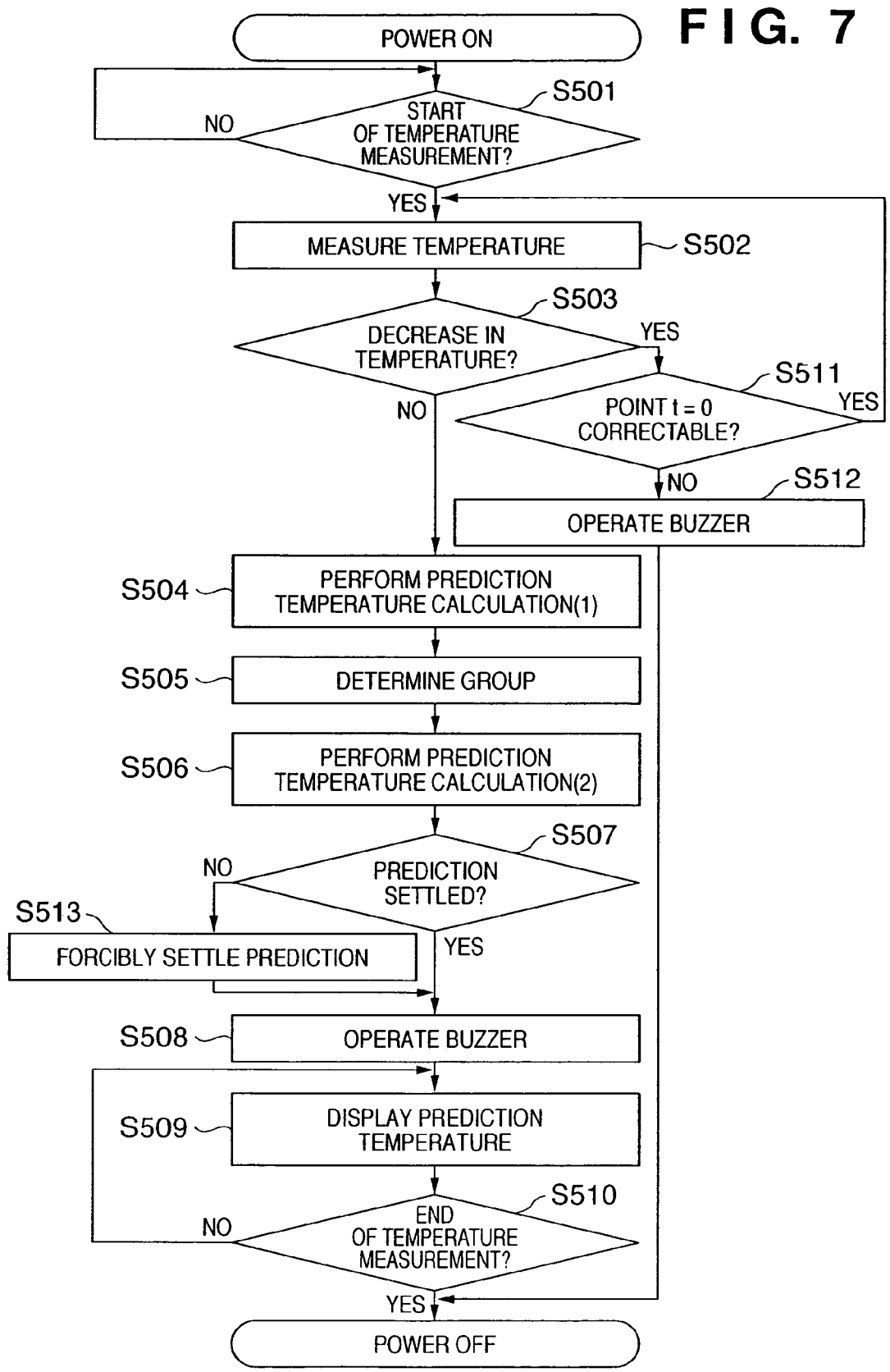
FIG. 7 is a flowchart showing the operation of the electronic clinical thermometer according to the first embodiment.

FIG. 7 is a flowchart of a body temperature measurement processing sequence in the electronic clinical thermometer of the first embodiment. The following operation starts upon power-on or the like as a trigger by pressing the power ON/OFF switch 4. The arithmetic processing unit 21 performs the program stored in the ROM 22 to implement the respective steps to be described below.

The CPU initializes the electronic clinical thermometer in step S501 and starts detecting the temperature value of the thermistor 13. For example, the CPU detects temperature values every 0.5 sec using the sensor.

In step S502, the CPU determines, as a prediction equation reference point (t=0), a timing at which a temperature value corresponding to a temperature rise of a predetermined value (e.g., 1° C.) or more from the immediately preceding actual measurement value (i.e., the actual measurement value 0.5 sec before) is measured. The CPU starts storing the above timing and temperature value as the specific timing and actual measurement value data (time-series data) in the RAM 23. That is, upon detecting an abrupt rise in temperature, the CPU determines that the measurement operator inserted the thermometer in a predetermined measurement target.

The CPU determines in step S503 whether a decrease in measurement temperature is observed during measurement. If YES in step S503, the process advances to step S511; otherwise, the process advances to step S504.

In step S504, the CPU sequentially derives prediction values (every 0.5 sec) by the above-described prediction equation using the data stored in step S502. Unlike in the conventional case, prediction calculations are simultaneously performed using the prediction equations respectively corresponding to the plurality of groups shown in FIG. 4. In this case, the calculations (10 different calculations of 1 to 8, 11, and 12) may be performed for all the groups, or the calculations may be performed for some peripheral groups of a given group set based on several actual measurement values as elements.

In step S505, the CPU determines grouping based on the changes of the prediction values respectively corresponding to the plurality of groups derived in step S504 after a predetermined period of time (e.g., 25 sec) is elapsed from the reference point (t=0). The details of this group determination operation will be described in detail later.

In step S506, the CPU stops calculating values except the groups determined in step S505 and continuously performs prediction calculations for the determined groups for a predetermined period of time.

The CPU determines in step S507 whether the prediction values derived in step S506 for the predetermined interval (e.g., t=25 sec to t=30 sec) derived in step S506 satisfy the preset prediction settling condition upon the elapse of a predetermined period of time (e.g., 30 sec) from the reference point (t=0). For example, the CPU determines whether temperature rise rate falls within the predetermined range (e.g., 0.1° C.). If YES in step S507, the process advances to step S508; otherwise, the process advances to step S513.

In step S508, the buzzer 31 is operated to generate a buzzer sound indicating the prediction settlement, and the process advances to step S509.

In step S509, the display unit 30 displays the derived prediction value.

The CPU determines in step S510 whether an instruction to indicate the end of display of the temperature measurement result is accepted. For example, the CPU may determine whether the power ON/OFF switch 4 is pressed, or the display may automatically end a predetermined period of time after the prediction temperature display.

In step S511, the CPU corrects the measured data. If the CPU normally corrects the data, the process returns to step S502; otherwise, the process advances to step S512.

In step S512, the buzzer 31 is operated to generate a buzzer sound indicating an error, thereby ending the temperature measurement. In this case, the buzzer sound is desirably different from that in step S508.

In step S513, when a predetermined period of time (e.g., 45 sec) has elapsed from the start of measurement by using, for example, a timer, the CPU forcibly finishes the prediction, and the process advances to step S507. That is, the CPU determines the prediction value obtained at that time as the final prediction value.

The temperature measurement operation is completed through the above steps.

<Group Determination Based on Prediction Value>

Processing (corresponding to step S505) for determining a group corresponding to a prediction equation used for the final prediction value by using a plurality of prediction values derived based on a plurality of prediction equations will be described.

FIG. 8 is a graph exemplifying actual measurement values and temporal changes in prediction values based on the plurality of prediction equations. FIG. 8 shows the actual measurement values detected by the thermistor 13 and the changes in prediction values corresponding to five groups, that is, the first group to the fifth group derived in step S504. In the following description, the groups are determined based on the temporal changes in these prediction values. That is, the correspondence between a prediction value having a highest precision and the prediction equation of a specific group will be determined.

In this example, a group satisfying the following two conditions is selected.

A change of every 10 sec regression is less than a predetermined value (e.g., 0.1° C.).

The condition corresponding to the prediction value derived every 0.5 sec is satisfied consecutively five times.

More specifically, a group corresponding to a time series whose prediction values have small variations is finally selected as an optimal group in this measurement. As described above, the prediction calculations are performed for a plurality of groups, and the temporal changes of the prediction values are compared to determine a group, thereby achieving higher-precision prediction.

In the above description, to increase the prediction precision, prediction values are derived a predetermined period of time after group determination (steps S506 and S507), and the final prediction value is determined. However, when a change is sufficiently small (e.g., 0.05° C.) during group determination, the prediction value corresponding to the determined group is regarded to be sufficiently high. This prediction value may be determined as the final prediction value.

A group can be determined based on temporal changes in actual measurement values. That is, the time-series data of the actual measurement values may be made to correspond to the grouping table shown in FIG. 6, and a group having a largest number of corresponding points may be selected and determined.

As has been described above, the electronic clinical thermometer of this embodiment can be implemented as an electronic clinical thermometer capable of high-precision measurement within a short time, thereby reducing the load on the measurement operator.

Other Embodiments

The object of the present invention is realized even by supplying a program for implementing the functions of the embodiment described above to a system or an apparatus, and causing the computer of the system or the apparatus to read out and execute the supplied program codes. Therefore, in order to cause the computer to implement the functions of the present invention, the program codes themselves installed in the computer constitutes the technical scope of the present invention.

The functions of the above-described embodiment are also realized when the program codes read out from the storage medium are written in the memory of a function expansion board inserted into the computer or a function expansion unit connected to the computer, and the CPU of the function expansion board or function expansion unit performs part or all of actual processing the instructions of the program codes. This processing also implement the functions of the above-described embodiment.

The invention claimed is:

1. An electronic clinical thermometer for predicting an equilibrium temperature based on a temporal change in actual measurement value of a measurement target temperature detected by a temperature detection element, comprising:

determination means for determining, based on temperature rise rate detected by the temperature detection element, whether said electronic thermometer has been inserted in the measurement target, prediction value derivation means for performing a deriving process involving deriving a plurality of prediction values from actual measurement values in accordance with a plurality of prediction equations, starting means for starting the deriving process performed by the prediction value derivation means when the determination means determines that said electronic thermometer has been inserted in the measurement target, selection means for selecting, after elapse of a predetermined period of time from the time at which the determination means determines that said electronic thermometer has been inserted in the measurement target, a prediction equation, which minimizes a temporal change of prediction value, among the plurality of prediction equations, and display output means for displaying a prediction value result on the basis of the selected prediction equation.

2. The electronic thermometer according to claim 1, wherein the determination means determines that said electronic thermometer has been inserted in the measurement target when the temperature rise rate is equal to or more than 0.03° C/0.5 sec.

3. An electronic clinical thermometer for predicting an equilibrium temperature based on a temporal change in actual measurement value of a measurement target temperature detected by a temperature detection element, comprising:

determination means for determining, based on temperature rise rate detected by the temperature detection element, whether said electronic thermometer has been inserted in the measurement target, prediction value derivation means for performing a deriving process involving deriving a plurality of prediction values from actual measurement values in accordance with a plurality of prediction equations, starting means for starting the deriving process performed by the prediction value derivation means when said determination means determines that said electronic thermometer has been inserted in the measurement target, selection means for selecting, after a predetermined period of time is elapsed from the time at which the determination means determines that said electronic thermometer has been inserted in the measurement target, one of the plurality of prediction equations on the basis of a temporal change in actual measurement value, and display output means for displaying a prediction value result derived based on the selected prediction equation.

4. The electronic clinical thermometer according to claim 1, wherein the plurality of prediction equations are set in correspondence with a plurality of groups obtained depending on a characteristic of the temporal change in actual measurement value.

5. The electronic clinical thermometer according to claim 1, wherein the temperature measurement element and a vicinity thereof have a low heat capacity but a high heat response.

6. The electronic clinical thermometer according to claim 1, further comprising temperature measurement start means for detecting a temperature rise and starting temperature measurement operation, storage means for storing data necessary for temperature measurement, including at least a temperature measurement end condition, and readout timing control means for controlling a readout timing for reading out the data from said storage means, wherein said readout timing means reads out the necessary data from said storage means when the predetermined condition is met upon power-on of the electronic clinical thermometer.

7. The electronic clinical thermometer according to claim 6, wherein the predetermined condition is detection of a temperature rise exceeding a predetermined period of time upon power-on of the electronic clinical thermometer.

8. The electronic clinical thermometer according to claim 6 wherein the temperature measurement end condition is defined such that the temperature rise within the predetermined period of time is less than a predetermined temperature value.

9. The electronic clinical thermometer according to claim 6, wherein said storage means comprises a nonvolatile memory.

10. The electronic clinical thermometer according to claim 9, wherein said nonvolatile memory comprises an EEPROM.

11. A method of controlling an electronic clinical thermometer for predicting an equilibrium temperature based on a temporal change in actual measurement value of a measurement target temperature detected by a temperature detection element, comprising:

determining whether said electronic thermometer has been inserted in the measurement target based on a temperature rise rate detected by the temperature detection element, deriving starting, when said electronic thermometer has been determined to be inserted in the measurement target, a deriving process involving deriving a plurality of prediction values from actual measurement values in accordance with a plurality of prediction equations, selecting, after elapse of a predetermined period of time from the time at which said electronic thermometer has been determined to be inserted in the measurement target, a prediction equation, which minimizes a temporal change of prediction value, among the plurality of prediction equations, and displaying a prediction value result on the basis of the selected prediction equation.

* * * * *